May 9, 1967 R. C. SPROULL ETAL 3,318,317
ACTIVATED CARBON SMOKE FILTER
Filed May 21, 1964
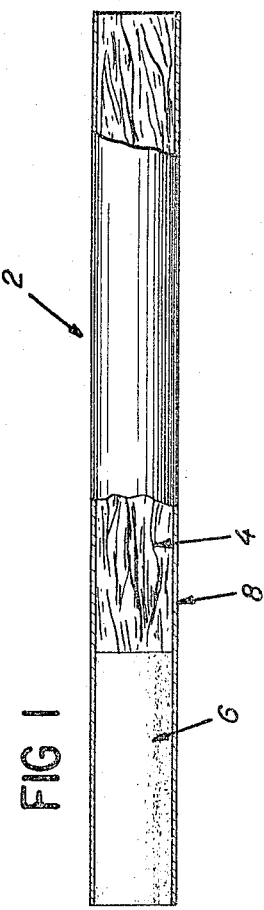
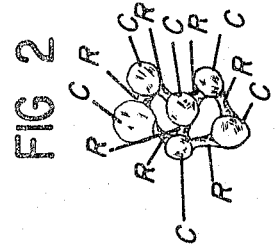
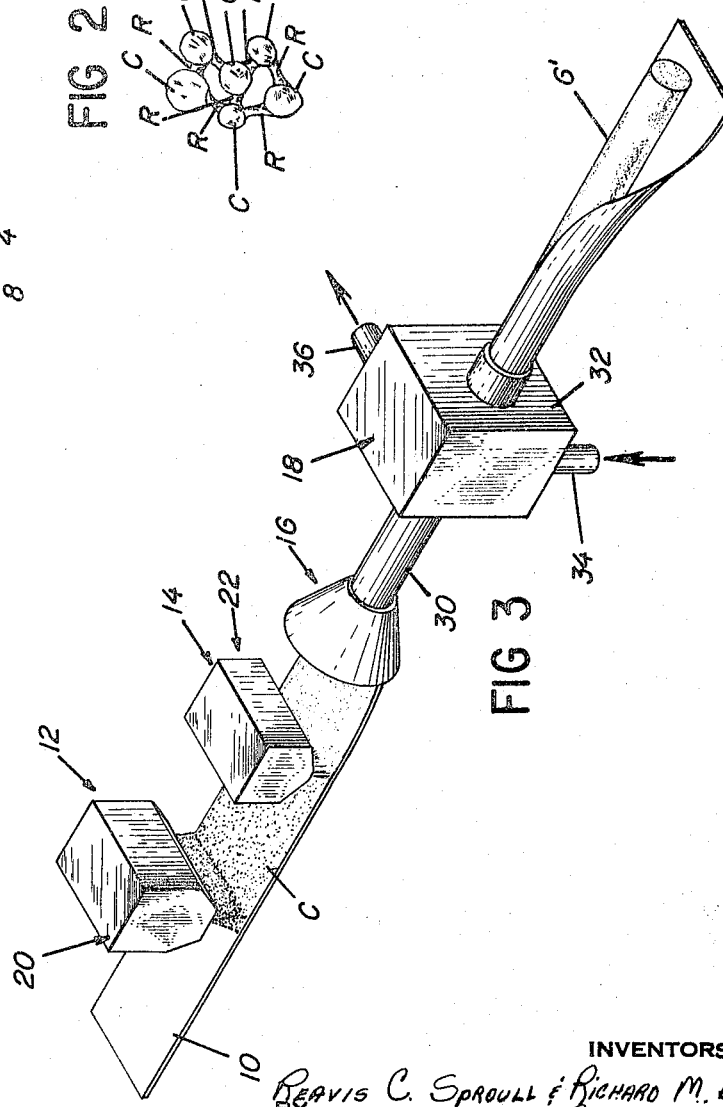
INVENTORS
Reavis C. Sproull & Richard M. Berger
BY Jacobi & Davidson
ATTORNEYS

United States Patent Office 3,318,317
Patented May 9, 1967

3,318,317
ACTIVATED CARBON SMOKE FILTER
Reavis C. Sproull and Richard M. Berger, Richmond, Va., assignors to American Filtrona Corporation, a corporation of New York
Filed May 21, 1964, Ser. No. 369,236
The portion of the term of the patent subsequent to Nov. 16, 1982, has been disclaimed
3 Claims. (Cl. 131—265)

This application is a continuation-in-part application of our earlier applications Ser. Nos. 306,343, 343,463 and 351,161 filed, respectively, Sept. 3, 1963, Feb. 10, 1964, and Mar. 11, 1964, and all now abandoned.

This invention relates generally to smoke filters, and is particularly concerned with a self-sustaining filter unit wherein smoke modification and/or filtration is accomplished primarily through the use of activated carbon particles in the unit.

In further detail, the present invention is concerned with a self-sustaining type of filter such as readily suitable for use as a cigarette filter, cigar filter, pipe filter, or the like, and wherein at least the predominate components of the filter consist of activated carbon particles and a resin binder therefor. Consistent herewith and as explained more fully herebelow, the resin binder is selected from the group of solvent soluble resins, and preferably water soluble resins.

It is generally well recognized by those familiar with smoke filtration problems that activated carbon is a particularly desirable and efficient smoke filtering medium. Still, the prior suggestions made by others appear to center about the use of activated carbon in generally loose form and/or as an additive in a conventional type of cellulose acetate oriented fiber filter. Where activated carbon is used as an additive, the filtering of smoke modifying characteristics of the filter are predominately controlled by other structural components of the filter, and the activated carbon merely has an auxiliary effect, since it is dispersed throughout the filter. On the other hand, where an accumulation of activated carbon particles are used in the filter, the prior teachings suggest that the same be incorporated in loose form between two fiber-type tow segments. In this instance, the carbon particles are allegedly used more efficiently, but still the overall filter has significant characteristics depending upon the structural features of the tow segments in the overall unit.

There thus remains a need for a smoke filter suitable for use in cigarettes, cigars, pipes, or the like, which utilizes activated carbon to its maximum possible efficiency. The present invention is directed toward satisfying this need and, as indicated above, is particularly concerned with the provision of a stabile self-sustaining smoke filter, wherein activated carbon particles are the major constituent.

Although in a broad sense the primary object of the present invention may be regarded as being the provision of an activated carbon particle stabile rod-like filter, the primary specific object of the present invention is to provide such a filter wherein the predominate filter components at least consist of activated carbon particles and a solvent soluble resin binder therefor.

Consistent with the primary specific object hereof, the invention has certain more detailed, yet significant, objects, namely: (a) the provision of such a filter wherein the solvent soluble resin preferably takes the form of particles of a water soluble resin; (b) the provision of such a filter wherein the resin particles are at least substantially uniformly dispersed throughout the filter to bond the activated carbon particles thereof together, substantially uniformly, and yet such that the activated carbon particles can efficiently handle smoke passing through the filter; (c) the provision of such a filter wherein the activated carbon particles and resin particles are so joined and heterogeneously dispersed as to cause smoke traveling through the filter to move in lateral as well as longitudinal directions, so as to come into contact with as much carbon as possible; (d) the provision of such a filter wherein the pressure drop and resistance to draw on the filter are within the recognized and tolerable limits established by the cigarette industry; (e) the provision of such a smoke filter which is adapted to incorporate smoke modifying filler materials, such as, puffed and/or comminuted tobacco stalks, which can be stabilized with alkalis and acid modifiers, if desired, and/or which can be formed with more dense filler and/or strength providing materials; and (f) the provision of such a smoke filter which can be formed by mass production techniques, so as to be available for widespread use at comparatively inexpensive costs.

As indicated previously, a smoke filter constructed in accordance herewith consists in major part of activated carbon particles bonded together by a solvent soluble resin. Such filter can incorporate, in addition, natural and/or synthetic fibers where low density properties are desirable, puffed and/or comminuted tobacco stalks and chemical stabilizer, if necessary, and/or metal fibers where strength properties are significant.

In a filter constructed according to the invention, activated carbon particles of comparatively small size are present in the ultimate filter in a relative amount of between 50% and 95% by weight. The activated carbon particles preferably are so dimensioned as to pass through a 10 mesh screen and retained on a 200 mesh screen. However, particles which pass through an 80 mesh screen at least provide the most desirable results. Moreover, activated charcoal is particularly suitable for use as the activated carbon material.

The bonding agent or binder of the filter is also in particle form and according to the invention comprises a soluble solvent resin, and preferably a water soluble resin. Carboxy methyl cellulose, natural gums, carbohydrates, water soluble cellulose acetate, and combinations thereof, have been found to be particularly satisfactory resins for use in accordance with the invention. These resins should, in any event, be finely divided and they preferably have a particle size of 50 microns, or less.

Consistent with the foregoing, the smoke filter constructed according to the invention comprises at least 50% by weight of activated carbon and at least 10% by weight of a solvent soluble resin binding agent for the carbon particles. The balance of the filter components comprising 30% by weight of the ultimate filter includes at least 1 component selected from the group consisting of activated carbon, a solvent soluble resin, and an additive which either augments the filtering characteristics or the strength characteristics of the filter.

The invention will possibly be better understood after reading the following description which refers to the annexed drawing. In the drawing:

FIGURE 1 is a side view, partially broken away, of a cigarette constructed in accordance herewith;

FIGURE 2 is an illustrative and greatly enlarged fragmental view of a portion of the filter included in the cigarette of FIGURE 1; and FIGURE 3 is a schematic and illustrative diagram showing one manner in which filter rods can be constructed in accordance with the invention.

The cigarette shown in FIGURE 1 is generally designated by the numeral 2. Such cigarette includes a tobacco section 4 and a filter section 6. The respective sections 4 and 6 are maintained in joined end to end relation by means of a conventional overwrap 8. The instant invention does not reside in the overwrap or in the tobacco section 4 of the cigarette 2. Instead, the instant invention, as should be apparent, concerns the filter section 6. It is this filter section 6 which is formed in major part at least by the activated carbon particles and the solvent soluble resin therefor.

In FIGURE 2, the carbon particles are designated by the letter "C," and the resin particles are designated by the letter "R." It is to be noted in this illustrative view, the resin particles bond together adjacent carbon particles by virtue of the adhering properties of the resin. Still, they preferably do not coat the entire surface area of the carbon particles. This lack of complete coating of the carbon particles by the binder particles is believed to be particularly advantageous in that it renders a filter having maximum exposed carbon surface areas. However, the instant invention is applicable whether the resin particles completely coat the carbon particles are not and FIGURE 2 presents the construction believed at present to provide for maximum efficiency.

To make a filter in accordance herewith, a process such as schematically illustrated in FIGURE 3 can be used. In this FIGURE, a ribbon-like conveyor belt 10 is shown as passing by, under or through a plurality of stations 12, 14, 16 and 18. The belt 10 is preferably, however, somewhat porous and yet made of a material which does not adhesively or cohesively react with either activated carbon particles or solvent soluble resin particles.

The belt 10 initially passes the station 12 in the illustrative embodiment of FIGURE 3, and at such station, activated carbon particles C are released onto the belt 10 so as to substantially cover the same. The hopper 20 located at the station 12 can be of any conventional type having a suitable controllable release mechanism for depositing the activated carbon particles onto the belt as indicated. In any event, the quantity of activated carbon particles deposited onto the belt is sufficient to provide for a uniform and full filter as ultimately formed.

The activated carbon particles which have been deposited on the belt at the station 12 pass with the belt to the station 14 where a spray head 22 sprays a solution of emulsion of the resin onto the belt. Preferably, a partially solvated, somewhat viscous, mixture of water and water soluble resin particles are deposited on the belt at the station 14. The viscosity is so controlled that the mixture readily disperses itself throughout the carbon particles. Yet, the mixture is such that the resin particles have substantially only their peripheral portions softened by the solvent. After receiving the solution or emulsion of the resin at the station 14, the belt 10 passes into a conventional forming nozzle 16 which causes the belt with the ingredients carried thereon to be formed into a rod. It is this formation which essentially controls the quantity of activated carbon particles and quantity of resin solution or emulsion deposited on the belt. The relative amounts of activated carbon particles and resin solution is such that the rod formed in the funnel 16 is substantially full. This rod then passes into a somewhat tapering tube 30. The taper of the tube is forwardly or to the right, as shown in FIGURE 3, so as to accommodate the shrinkage experienced according to the invention with evaporation of the solvent. More specifically, it will be noted that the tapering tube 30 passes through a heat chamber 32 disposed at the station 18. The heat chamber 32 can be of any suitable type, for example, and as shown, of the type through which steam can be passed from an inlet 34 thereof to an outlet 36 thereof. Alternatively, however, the heating chamber can well be formed with an electrical heating unit therein, or it can be otherwise heated.

The purpose of the heating chamber 32 is to heat the belt 10 as shaped into a rod and the ingredients contained in the belt whereby the solvent is caused to evaporate. This evaporation inherently results in some shrinkage, and it is this shrinkage which is accommodated by the tapering tube 30. Yet, the excess solvent in the solution is not so substantial that it cannot be accommodated by the tapering tube.

When the material within the belt 10 passes through the tube 30 and leaves the forward end thereof, i.e., the right end as shown, the solvent has been evaporated and the resin binder, as dispersed throughout the filter unit serves to bond adjacent carbon particles together. As a result, a rod-like structure 6' is produced. When the belt 10 leaves the right end of the tapered tube 30, as shown in FIGURE 3, the same returns to its initial flat condition, but the rod 6' which has been produced by virtue of the evaporation of the solvent remains as a stabile self-sustaining element. It is this element which is then cut into suitable lengths and used for the filter of the cigarette of FIGURE 1.

Although one particular method has been shown in FIGURE 3 and described in some detail above, it is to be understood that the described method is but one of many methods which may be used to produce the cigarette filter hereof. Again, by way of example, another embodiment of the invention contemplates mixing the solvent soluble resin solution with the activated carbon particles initially. This mixture can be made in any conventional mixing apparatus. After forming the mixture, consistent with this modified embodiment, the mixture would be deposited on the belt 10 by some suitable hopper apparatus of conventional design. The hopper apparatus would replace the hopper 20 and spray head 22, so that the mixture deposited on the belt 10 would initially pass with the belt to the forming nozzle 16 and then through the heating station 18. The end result would be essentially the same.

As a still further alternative embodiment hereof, a mixture can be prepared of the activated carbon particles and solvent soluble resin, and this mixture can be made substantially viscous. The viscous mixture would then be passed through a suitable forming tube under some pressure. The forming tube would itself be heated to evaporate the solvent. In this instance, the evaporation may be somewhat slower due to the fact that the belt 10 would not be present to provide a porous holding medium for the rod-like shaft and due to the fact that the forming nozzle could in turn not be made with suitable air vents or the like to permit quick evaporation. In this regard, it is to be appreciated that the tube 30 can easily be vented along its length so as to facilitate the evaporation desired.

The methods discussed above are particularly suitable for forming a filter in accordance herewith, but still, as clearly indicated, other methods can be used to form a filter constructed in accordance herewith.

The following examples illustrated further the manner in which the filters hereof can be made.

EXAMPLE 1

Activated carbon particles passing a 10 mesh screen and retained on a 100 mesh screen were delivered to a hopper, such as the hopper 20 in FIGURE 3. Carboxy methyl cellulose particles, having a particle size of approximately 50 microns were dispersed in a water solution having a viscosity merely sufficient to partially dissolve the particles and permit the solution to be sprayed. The solution was fed to a spray head, such as the spray head 22 of FIGURE 3.

In relative amounts, 90 parts by weight of activated carbon particles were deposited on a belt, such as the belt 10 of FIGURE 3, and these particles were sprayed with a relative amount of 10 parts of the resin water solution. The belt was then passed through a conventional forming nozzle 16 and into a tapering tube terminating in an outlet which resulted in the formed rod having the diameter of substantially 8 mm. The filter rod resulting therefrom is stabile and self-sustaining and is efficient as a cigarette filter.

EXAMPLE 2

Example 1 was repeated with the carboxy methyl cellulose particles being replaced by water soluble cellulose acetate particles of substantially equivalent size. The results are substantially the same.

EXAMPLE 3

Example 1 was repeated with the carboxy methyl cellulose particles being replaced by a water soluble natural gum, namely, a locust bean derivative. The particle sizes were the same as set forth in FIGURE 1.

EXAMPLE 4

Example 1 was repeated but the carbon particles were such as to only pass a 50 mesh screen. The results are slightly less efficient, but still the filter is satisfactory in operation.

EXAMPLE 5

Example 1 was repeated with the carboxy methyl cellulose particles replaced by a mixture in equivalent amounts of carboxy methyl cellulose particles, and natural gum, namely, guar and water soluble cellulose acetate particles. The results were the same.

EXAMPLE 6

Example 1 was repeated with the activated carbon particles being present in a relative amount of 80% and with the carboxy methyl cellulose particles being present in an amount of 20%. The results were substantially the same.

EXAMPLE 7

Example 1 was repeated with the carbon particles being present in a relative amount of 60% and with the carboxy methyl cellulose particles being present in a relative amount of 40%. The results were still sufficient.

EXAMPLE 8

Example 1 was repeated with the carboxy methyl cellulose particles being replaced by the mixture of Example 3, with the activated carbon particles being present in a relative amount of 60%, with the solvent soluble solution being present in an amount of 10%. Mixed in with the activated carbon particles was, in relative amount, 30% of a mixture of metal fibers, comminuted tobacco stalks and chemical stabilizers. The mixture of the activated carbon, the metal fibers, the comminuted tobacco stalks and the chemical stabilizers was applied in the same manner as the activated carbon. The results were within the tolerable ranges.

EXAMPLE 9

Example 1 is repeated but with the resin being water soluble carbohydrate, namely, commercially available starch. The results are substantially the same.

It appears unnecessary to give further examples in this specification since the invention can be more than adequately understood from the preceding discussion and even the first example given.

After reading this specification, it should be readily apparent that the objects set forth at the outset hereof have been successfully achieved. Accordingly,

What is claimed is:

1. In a smoke means of the type wherein a quantity of tobacco is ignited and smoke is drawn therefrom by a smoker, the improvement which comprises a filter means interposed between the smoker and the tobacco, said filter means comprising an elongated plug disposed in said smoking means such that smoke passes therethrough to reach the smoker, said plug consisting essentially of the following constituents:
    (a) at least in excess of 50 percent by weight of activated carbon particles, said activated carbon particles having a maximum dimension which is a small fraction of the minimum dimension of said plug; and
    (b) at least about 10 percent by weight of partially solvated, water soluble, resin particles, said resin being operative essentially alone to effect bonding bridges between juxtaposed constituents; said plug further being characterized by:
        (i) said activated carbon particles serving as the major active component of said plug and being active to remove both solid and gas phase constituents from smoke passing through said plug during utilization of said smoking means;
        (ii) said resin essentially alone serving as a binder between said constituents and defining a multiplicity of discrete bonding means predominantly individually smaller than said activated carbon particles;
        (iii) said constituents cooperating through said bonding means to give structural continuity to said plug as a self-sustaining, substantially particulate stable body in the form of a continuous porous matrix with the discrete bonding means and constituents providing a labyrinth of smoke passage therethrough;
        (iv) said constituents being co-mingled in any cross-section of said body and with said activated carbon particles randomly arranged in said plug such that a multiplicity of said activated carbon particles are present in substantially any cross-section of said body; and
        (v) said body deriving its stability substantially only from said cooperation between said bonding means and said constituents.

2. The improvement according to claim 1 wherein said constituents further include in minor part by weight a smoke-modifying additive.

3. The improvement according to claim 1 wherein said resin is selected from the group consisting of carboxymethyl cellulose, natural gums and carbohydrates, water soluble cellulose acetate and combinations thereof.

References Cited by the Examiner

UNITED STATES PATENTS

| | | | |
|---|---|---|---|
| 2,806,474 | 9/1957 | Yarsley | 131—267 |
| 3,032,445 | 5/1962 | Hamon | 131—10 |
| 3,101,723 | 7/1963 | Seligman et al. | 131—208 |
| 3,217,715 | 11/1965 | Berger et al. | 131—208 |

FOREIGN PATENTS

| | | |
|---|---|---|
| 1,110,463 | 10/1955 | France. |
| 538,529 | 8/1941 | Great Britain. |
| 798,118 | 7/1958 | Great Britain. |

SAMUEL KOREN, *Primary Examiner.*

MELVIN D. REIN, *Examiner.*